(12) United States Patent
Maeda et al.

(10) Patent No.: US 12,291,109 B2
(45) Date of Patent: May 6, 2025

(54) VEHICLE CONTROL DEVICE

(71) Applicant: MITSUBISHI JIDOSHA KOGYO KABUSHIKI KAISHA, Tokyo (JP)

(72) Inventors: Yuki Maeda, Tokyo (JP); Ryo Shimizu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 17/923,083

(22) PCT Filed: May 19, 2021

(86) PCT No.: PCT/JP2021/019036
§ 371 (c)(1),
(2) Date: Nov. 3, 2022

(87) PCT Pub. No.: WO2021/246179
PCT Pub. Date: Dec. 9, 2021

(65) Prior Publication Data
US 2023/0158890 A1   May 25, 2023

(30) Foreign Application Priority Data
Jun. 1, 2020   (JP) .................. 2020-095235

(51) Int. Cl.
*B60L 3/00* (2019.01)
*B60L 15/20* (2006.01)
*B60L 50/14* (2019.01)

(52) U.S. Cl.
CPC ............. *B60L 3/0038* (2013.01); *B60L 15/20* (2013.01); *B60L 50/14* (2019.02)

(58) Field of Classification Search
CPC ......... B60L 3/0038; B60L 15/20; B60L 50/14
(Continued)

(56) References Cited

U.S. PATENT DOCUMENTS

2010/0241305 A1\* 9/2010 Itabashi ............... B60G 17/018
701/29.2

FOREIGN PATENT DOCUMENTS

| JP | 06-090577 A | 3/1994 |
| JP | 10-75506 A | 3/1998 |

(Continued)

OTHER PUBLICATIONS

Extended European Search Report for European Application No. 21817584.2, dated Nov. 2, 2023.
(Continued)

*Primary Examiner* — Isaac G Smith
(74) *Attorney, Agent, or Firm* — BIRCH, STEWART, KOLASCH & BIRCH, LLP

(57) ABSTRACT

A vehicle control device includes a drive source mounted on a vehicle, a differential device configured to distribute a driving force generated by the drive source to a right drive wheel and a left drive wheel, a speed sensor configured to detect a rotation speed of the drive source, a pair of wheel speed sensors configured to detect rotation speeds of the right drive wheel and the left drive wheel, and a control device configured to set an index value having a value obtained by multiplying the rotation speed of the drive source by a predetermined coefficient in a case that at least one of the pair of wheel speed sensors fails, and to control torque output from the drive source based on the index value.

5 Claims, 4 Drawing Sheets

(58) Field of Classification Search
USPC .......................................................... 701/22
See application file for complete search history.

(56) References Cited

FOREIGN PATENT DOCUMENTS

| | | | |
|---|---|---|---|
| JP | 2007-92823 | A | 4/2007 |
| JP | 2010-90721 | A | 4/2010 |
| JP | 2010090721 | A * | 4/2010 |
| JP | 5379541 | B2 | 12/2013 |
| JP | 2019-103306 | A | 6/2019 |

OTHER PUBLICATIONS

International Preliminary Report on Patentability, issued in PCT/JP2021/019036, PCT/IPEA/409, dated Aug. 4, 2022.
International Search Report, issued in PCT/JP2021/019036, PCT/ISA/210, dated Jul. 20, 2021.
Written Opinion of the International Preliminary Examining Authority, PCT/IPEA/408, issued in PCT/JP2021/019036, dated Apr. 12, 2022.
Written Opinion of the International Searching Authority, issued in PCT/JP2021/019036, PCT/ISA/237, dated Jul. 20, 2021.
Indonesian Office Action for Indonesian Application No. P00202213753, dated Oct. 7, 2024, with an English translation.
Chinese Office Action issued in Chinese Application No. 202180034153.6 on Mar. 6, 2025, with English translation.

* cited by examiner

VEHICLE CONTROL DEVICE

TECHNICAL FIELD

The present disclosure relates to a vehicle control device configured to execute control for preventing burn-in of a differential device.

BACKGROUND ART

In the related art, a technique for preventing occurrence of burn-in due to an increase in a differential rotation speed in a vehicle in which a differential device is interposed between left and right wheels of the vehicle has been proposed. For example, there is known a technique of reducing the differential rotation speed by setting a supply current to a motor to zero or reversely rotating the motor when the differential rotation speed (a rotation speed difference) between left and right wheel shafts is equal to or higher than a predetermined value. By this control, burn-in of the differential device can be prevented (see Patent Literature 1).

CITATION LIST

Patent Literature

Patent Literature 1: JP5379541B

SUMMARY OF INVENTION

Technical Problem

Generally, an average value of rotation speeds (the numbers of revolutions) of the left and right wheels distributed by the differential device coincides with a rotation speed (an input rotation speed) input to the differential device. Therefore, by measuring at least two types of rotation speeds among the rotation speed of the left wheel, the rotation speed of the right wheel, and the input rotation speed, the differential rotation speed of the differential device can be obtained. On the other hand, when wheel speed sensors that measure the rotation speeds of the left and right wheels fails, it is difficult to obtain an appropriate differential rotation speed, and it may not be possible to prevent the occurrence of burn-in.

The present disclosure is made in view of the above-described circumstances, and an object of the present disclosure is to provide a vehicle control device that can prevent burn-in of a differential device when a wheel speed sensor fails. The present disclosure is not limited to having this object, and can have another object of attaining functions and effects that are derived from configurations shown in the "description of embodiments" to be described later and that cannot be attained with a related-art technique.

Solution to Problem

A vehicle control device of the present disclosure includes: a drive source mounted on a vehicle; a differential device configured to distribute a driving force generated by the drive source to a right drive wheel and a left drive wheel; a speed sensor configured to detect a rotation speed of the drive source; and a pair of wheel speed sensors configured to detect rotation speeds of the right drive wheel and the left drive wheel. The vehicle control device further includes a control device configured to set an index value having a value obtained by multiplying the rotation speed of the drive source by a predetermined coefficient in a case that at least one of the pair of wheel speed sensors fails, and to control torque output from the drive source based on the index value.

Advantageous Effects of Invention

According to the technique of the present disclosure, it is possible to prevent burn-in of a differential device when a wheel speed sensor fails.

DESCRIPTION OF EMBODIMENTS

[1. Configuration]

Figure 1:
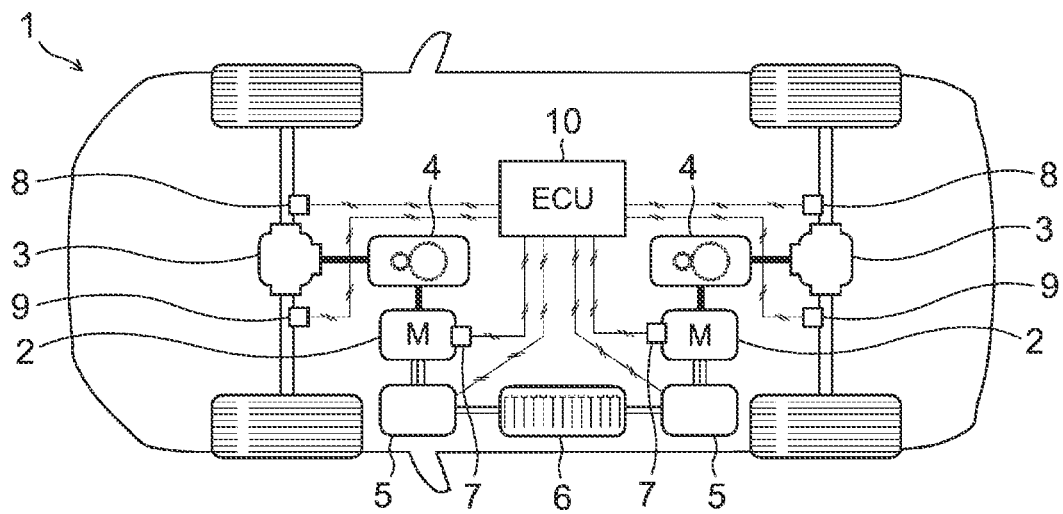
FIG. 1 is a schematic view of a vehicle to which a vehicle control device according to an embodiment is applied.

A vehicle 1 to which a vehicle control device according to an embodiment is applied will be described with reference to FIGS. 1 to 5. A motor 2 and a differential device 3 are mounted on the vehicle 1. The motor 2 is a driving source of the vehicle 1 configured to generate a driving force of the vehicle 1 using electric power stored in a battery 6. The motor 2 is, for example, a three-phase alternating current synchronous motor, and is connected to the battery 6 via an inverter 5. A front wheel motor 2 (a front motor) and a rear wheel motor 2 (a rear motor) are separately mounted on the vehicle 1 shown in FIG. 1. However, either one of the front wheel motor 2 and the rear wheel motor 2 may be omitted, or a single motor 2 may drive four wheels.

The differential device 3 is a device configured to distribute a driving force generated by the motor 2 to left and right driving wheels, and is interposed between a left wheel shaft and a right wheel shaft. A transmission 4 is interposed in a transmission path of the driving force that connects the motor 2 and the differential device 3. The transmission 4 is a device configured to change (decrease or increase) the driving force output from the motor 2, and includes, for example, a plurality of gear trains, a planetary gear mechanism, and the like. A gear ratio (that is, input rotation speed÷output rotation speed), which is a ratio of an input rotation speed to an output rotation speed of the transmission 4, may be a fixed value or a variable value. The information on the gear ratio of the transmission 4 is grasped by a control device 10 (ECU) to be described later.

The battery 6 is, for example, a lithium ion battery or a nickel hydrogen battery, and is a secondary battery capable of supplying a high-voltage DC current of several hundred volts. The inverter 5 is a power conversion device configured to convert DC power on a battery 6 side and AC power on a motor 2 side, and is interposed on a power line that connects the battery 6 and the motor 2. An inverter circuit including a switching element such as an Insulated Gate Bipolar Transistor (IGBT) or a Metal-Oxide-Semiconductor Field-Effect Transistor (MOSFET) is provided in the inverter 5. An output (torque) of the motor 2 is controlled by controlling an operating state (an on and off timing and a driving frequency) of the inverter 5.

Figure 2:
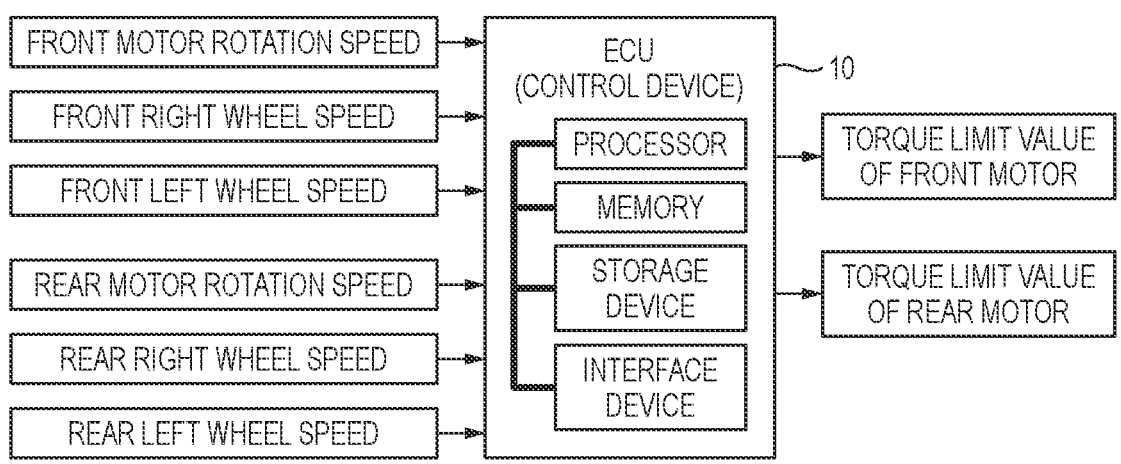
FIG. 2 is a block diagram showing a configuration of a control device (ECU) in FIG. 1.

The operating state of the inverter 5 is controlled by the control device 10. The control device 10 is an electronic control device (a computer) configured to control torque output from the motor 2 by managing on and off state of the switch element provided in the inverter 5. As shown in FIG. 2, a processor (a central processing unit), a memory (a main memory), a storage device (a storage), an interface device, and the like are provided in the control device 10, and are communicably connected to one another via an internal bus. A motor speed sensor 7, a right wheel speed sensor 8, and a left wheel speed sensor 9 are connected to the control device 10, and a vehicle speed sensor and an accelerator opening degree sensor (not shown) are also connected to the control device 10.

The motor speed sensor 7 is a speed sensor configured to detect a motor rotation speed (a rotation speed output from the motor 2). The right wheel speed sensor 8 is a wheel speed sensor configured to detect a rotation speed (a right wheel speed) of a drive wheel on a right side with respect to the differential device 3, and the left wheel speed sensor 9 is a wheel speed sensor configured to detect a rotation speed (a left wheel speed) of a drive wheel on a left side with respect to the differential device 3. Various types of information on the rotation speeds detected by these sensors 7 to 9 are input to the control device 10. The vehicle speed sensor is a sensor configured to detect a traveling speed (a vehicle speed) of the vehicle 1, and the accelerator opening degree sensor is a sensor configured to detect a depression amount (an accelerator opening degree) of an accelerator pedal. In FIG. 1, the sensors 7 to 9 are provided on a front side and a rear side, and any one of the sensors 7 to 9 may be omitted.

A magnitude of the torque output from the motor 2 is set according to the vehicle speed and the accelerator opening degree. On the other hand, depending on a traveling state of the vehicle 1, the torque of the motor 2 may become excessive. For example, when a difference between the rotation speeds of the left and right drive wheels becomes large, burn-in may occur inside the differential device 3. Therefore, the control device 10 sets a torque limit value of the motor 2, and controls the inverter 5 such that the torque actually output from the motor 2 does not exceed the torque limit value. In the vehicle 1 shown in FIG. 1, the output of each of the front wheel motor 2 and the rear wheel motor 2 is controlled based on the torque limit value individually set for each of the front wheel motor 2 and the rear wheel motor 2.

Figure 3:
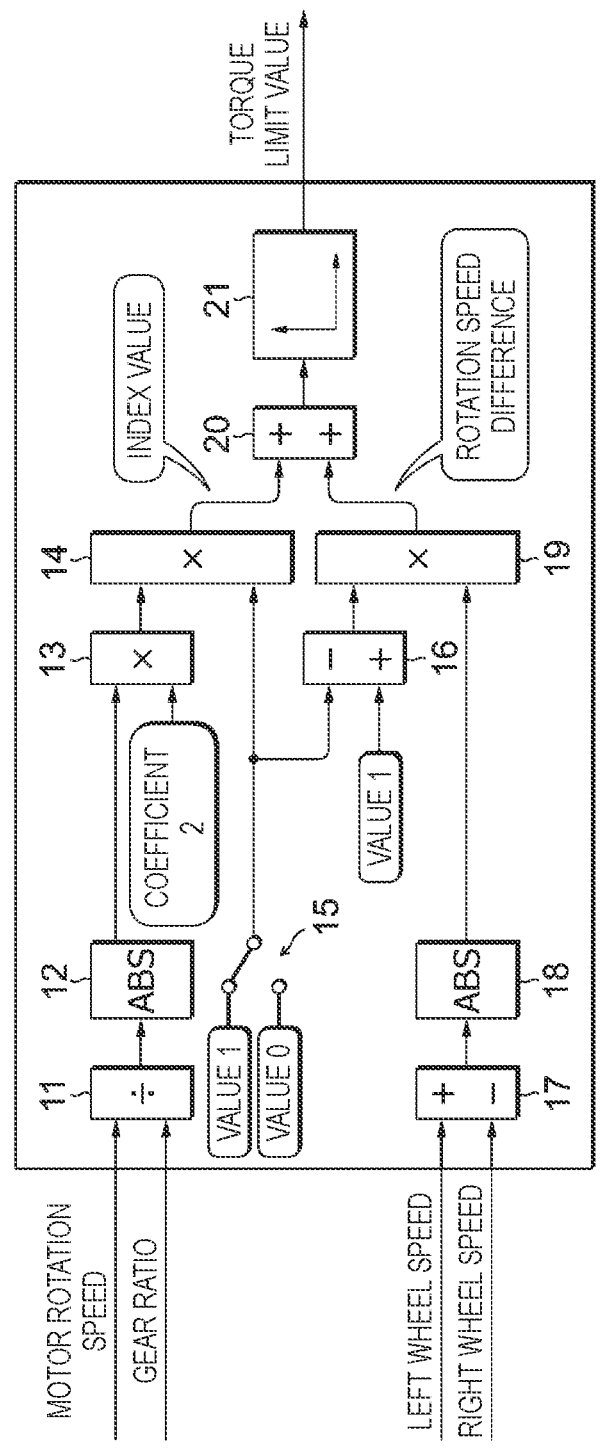
FIG. 3 is a block diagram showing a processing content of the control device in FIG. 1.

FIG. 3 is a block diagram showing a processing content for setting the torque limit value. The torque limit value is set using different methods depending on whether the wheel speed sensors 8, 9 fail or not. For example, in a case in which the pair of wheel speed sensors 8, 9 provided on left and right sides of the same differential device 3 do not fail, the torque limit value is set based on a rotation speed difference between the left and right drive wheels. On the other hand, in a case that at least one of the pair of wheel speed sensors 8, 9 provided on the left and right sides of the same differential device 3 has failed, the torque limit value is set based on the motor rotation speed. The former setting method corresponds to a processing content shown in a lower part in FIG. 3, and the latter setting method corresponds to a processing content shown in an upper part in FIG. 3. The presence or absence of a failure in the wheel speed sensors 8, 9 may be determined based on a signal transmitted from the wheel speed sensors 8, 9, or a determination result obtained by a failure determination device (not shown) may be used.

Here, a setting method in a case that at least one of the pair of wheel speed sensors 8, 9 has failed will be described in detail. A divider 11 shown in FIG. 3 calculates a value (a value obtained by multiplying a reciprocal of the gear ratio of the transmission 4) obtained by dividing the motor rotation speed by the gear ratio of the transmission 4. The value calculated here corresponds to the rotation speed output from the transmission 4, in other words, corresponds to the rotation speed input to the differential device 3. The value calculated by the divider 11 is input to a multiplier 13 after a sign has been removed through an absolute value calculator 12. The multiplier 13 calculates an index value obtained by multiplying the input value by a predetermined coefficient. A value of the coefficient is set to a value (for example, within a range of 1.9 to 2.1) close to 2. This value of the coefficient is preferably set to a value of 2 or more (for example, within a range of 2.0 to 2.1), and more preferably set to 2. The value calculated by the multiplier 13 is input to a multiplier 14.

The multiplier 14 is configured to calculate a product of the value calculated by the multiplier 13 and an output of a failure determiner 15. The failure determiner 15 is configured to output 1 in a case that at least one of the pair of wheel speed sensors 8, 9 has failed, and to output 0 in a case that neither of the pair of wheel speed sensors 8, 9 has failed. Therefore, in a case that neither of the pair of wheel speed sensors 8, 9 has failed, an output of the multiplier 14 becomes 0 regardless of a magnitude of an output of the multiplier 13. Only in a case that at least one of the pair of wheel speed sensors 8, 9 has failed, the output of the multiplier 13 is output from the multiplier 14 as it is. In this way, in a case that at least one of the pair of wheel speed sensors 8, 9 has failed, the multiplier 14 functions to set an index value having a value obtained by multiplying the motor rotation speed by the predetermined coefficient. The value calculated by the multiplier 14 is transmitted to an adder 20.

Next, a setting method in a case that neither of the pair of wheel speed sensors 8, 9 has failed will be described in detail. A subtractor 17 shown in FIG. 3 is configured to calculate a value (a value obtained by adding a left wheel speed and a complement of a right wheel speed) obtained by subtracting the right wheel speed from the left wheel speed. The value calculated here corresponds to a rotation speed difference between left and right sides of the differential device 3. The value calculated by the subtractor 17 is input to a multiplier 19 after a sign has been removed through an absolute value calculator 18. The multiplier 19 is configured to output a product of an output of the absolute value calculator 18 and an output of a subtractor 16. The subtractor 16 is configured to output a value obtained by inverting the output of the failure determiner 15.

For example, the subtractor 16 outputs 1 when the failure determiner 15 outputs 0, and outputs 0 when the failure determiner 15 outputs 1. Therefore, in a case that at least one of the pair of wheel speed sensors 8, 9 has failed, an output of the multiplier 19 becomes 0 regardless of a magnitude of the output of the absolute value calculator 18. Only in a case that neither of the pair of wheel speed sensors 8, 9 has failed, the output of the absolute value calculator 18 is output from the multiplier 19 as it is. In this way, the multiplier 19 functions to calculate the rotation speed difference between the left and right drive wheels in a case that the pair of wheel speed sensors 8, 9 do not fail. A value calculated by the multiplier 19 is transmitted to the adder 20.

The adder 20 is configured to calculate a sum of the output of the multiplier 14 and the output of the multiplier 19. The output of the multiplier 14 is 0 in a case that the pair of wheel speed sensors 8, 9 do not fail, and the output of the multiplier 19 is 0 in a case that the pair of wheel speed sensors 8, 9 have failed. Therefore, the adder 20 functions to receive one of the multipliers 14, 19 that outputs a value other than 0 as it is, and to transfer this information downstream. A value output from the adder 20 is input to a limit value setter 21. The limit value setter 21 is configured to output a torque limit value corresponding to a value (an index value or a rotation speed difference) transmitted from the adder 20. In the limit value setter 21, at least a map or a mathematical formula that defines a correspondence relationship between the index value and the torque limit value set by the multiplier 14 is stored in advance.

Figure 4A:
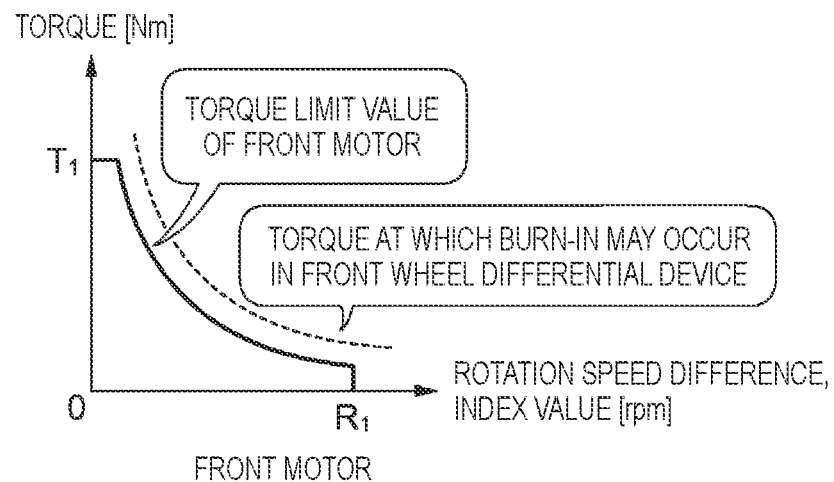
FIG. 4A is an example of a map stored in the control device in FIG. 1, and is a map that defines a relationship between a rotation speed difference (an index value) in a front wheel differential device and a torque limit value of a front wheel motor.
Figure 4B:
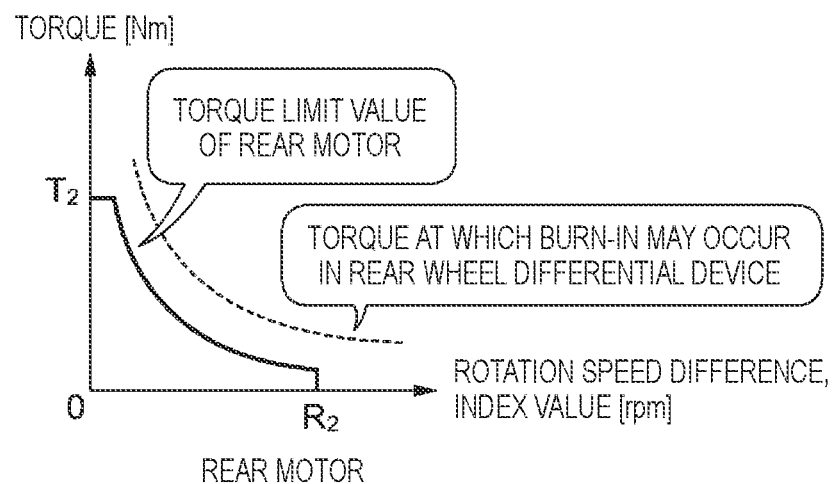
FIG. 4B is an example of a map stored in the control device in FIG. 1, and is a map that defines a relationship between a rotation speed difference (an index value) in a rear wheel differential device and a torque limit value of a rear wheel motor.

FIG. 4A is a graph illustrating a relationship between a torque limit value and an index value in the front wheel motor 2. A solid line in the graph represents the torque limit value, and a broken line represents torque at which burn-in may occur in the front wheel differential device 3. The graph of the broken line shows a relationship in which the torque on a vertical axis is substantially inversely proportional to the index value on a horizontal axis. FIG. 4B is a graph illustrating a relationship between a torque limit value and an index value in the rear wheel motor 2. A solid line in the graph represents the torque limit value, and a broken line represents torque at which burn-in may occur in the rear wheel differential device 3.

The rear wheel motor 2 and the rear wheel differential device 3 are provided separately from the front wheel motor 2 and the front wheel differential device 3, and do not necessarily have the same characteristics as those of the front wheel motor 2 and the front wheel differential device 3. Therefore, the torque limit value of the rear wheel motor 2 can be set separately from the torque limit value of the front wheel motor 2. Shapes of the solid line graph and the broken line graph in FIG. 4B do not necessarily match shapes of the solid line graph and the broken line graph in FIG. 4A. A maximum value $T_2$ of the torque limit value in FIG. 4B is different from a maximum value $T_1$ of the torque limit value in FIG. 4A. Similarly, a maximum value $R_2$ of the index value in FIG. 4B is different from a maximum value $R_1$ of the index value in FIG. 4A.

In both FIGS. 4A and 4B, the graph of the torque limit value indicated by the solid line is set to be lower (at a left side) with respect to at least the graph of the broken line. Therefore, when the rotation speed difference is input to the limit value setter 21, the torque limit value corresponding to the rotation speed difference is set. Accordingly, a situation is prevented in which excessive torque is output from the motor 2, and the occurrence of burn-in in the differential device 3 is prevented. When an index value is input to the limit value setter 21, the index value has a value corresponding to a rotation speed approximately twice the rotation speed of the motor 2. On the other hand, it is known that the rotation speed difference that may be generated in the differential device 3 is twice the input rotation speed at maximum. That is, the index value referred to here has a value corresponding to the maximum rotation speed difference that may be generated in the differential device 3. Therefore, the torque limit value is set using the index value instead of the rotation speed difference, so that the situation is prevented in which the excessive torque is output from the motor 2, and the occurrence of burn-in in the differential device 3 is prevented.

[2. Flowchart]

Figure 5:
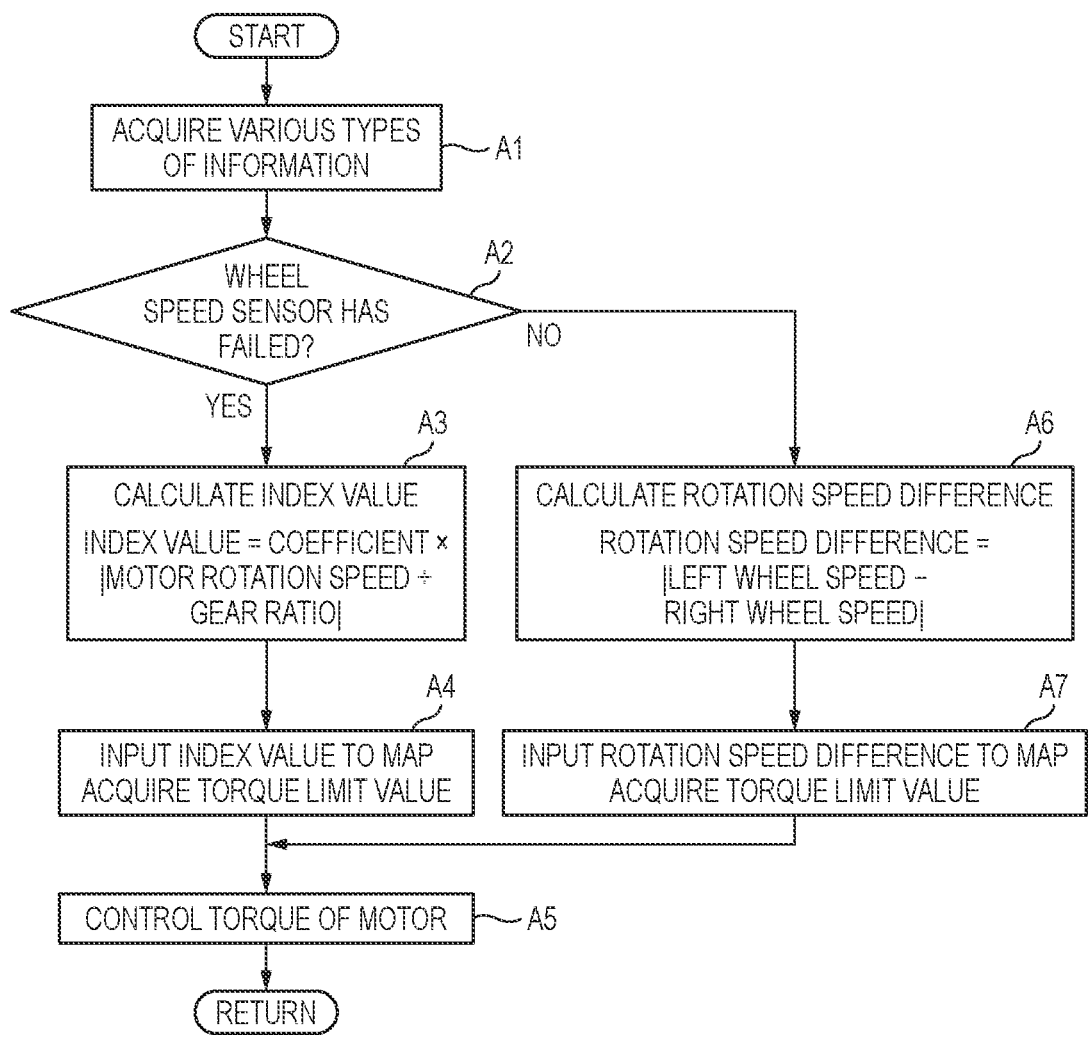
FIG. 5 is a flowchart showing a flow of control executed by the control device in FIG. 1.

FIG. 5 is a flowchart showing a flow of control executed by the control device 10.

In step A1, information on the motor rotation speed detected by the motor speed sensor 7 and information on the left and right wheel speeds detected by the pair of left and right wheel speed sensors 8, 9 are input to the control device 10. When the gear ratio of the transmission 4 is variable, information on a value of the gear ratio is also input to the control device 10. In the subsequent step A2, it is determined whether at least one of the pair of wheel speed sensors 8, 9 has failed. As shown in FIG. 1, when the pair of left and right wheel speed sensors 8, 9 are provided on a front wheel side and a rear wheel side, respectively, the front wheel side and the rear wheel side are distinguished from each other, and the presence or absence of a failure is determined independently of each other.

When it is determined in step A2 that at least one of the wheel speed sensors 8, 9 has failed, the process proceeds to step A3, and the index value is set based on the motor rotation speed. The index value is calculated by, for example, multiplying an absolute value of a value obtained by dividing the motor rotation speed by the gear ratio of the transmission 4 by a predetermined coefficient. In the subsequent step A4, an index value is used as an argument of the map shown in FIGS. 4A and 4B, and the torque limit value corresponding to the index value is acquired. Thereafter, in step A5, an operation state of the inverter 5 is controlled such that the torque of the motor 2 does not exceed the torque limit value. In this way, even if the wheel speed sensors 8, 9 have failed, since the torque of the motor 2 is appropriately limited, the occurrence of burn-in in the differential device 3 is prevented.

When it is determined in step A2 that neither of the wheel speed sensors 8, 9 has failed, the process proceeds to step A6, and the actual rotation speed difference is calculated. The rotation speed difference is calculated as, for example, an absolute value of a value obtained by subtracting the right wheel speed from the left wheel speed. In the subsequent step A7, the rotation speed difference is used as the argument of the map shown in FIGS. 4A and 4B, and the torque limit value corresponding to the rotation speed difference is acquired. Thereafter, in step A5, the operation state of the inverter 5 is controlled such that the torque of the motor 2 does not exceed the torque limit value. In this way, in a case that the wheel speed sensors 8, 9 do not fail, a value of the rotation speed difference is accurately calculated. Therefore, the torque of the motor 2 is appropriately limited, and the occurrence of burn-in in the differential device 3 is prevented.

[3. Operation and Effect]

(1) The above-described vehicle control device includes: a motor 2 mounted on a vehicle 1; a differential device 3 configured to distribute a driving force generated by the motor 2 to left and right drive wheels; a motor speed sensor 7 configured to detect a rotation speed of the motor 2; and a pair of wheel speed sensors 8, 9 configured to detect rotation speeds of the left and right drive wheels. Further, the above-described vehicle control device is provided with a control device 10 configured to set an index value having a value obtained by multiplying a rotation speed of the motor 2 by a predetermined coefficient in a case that at least one of the pair of wheel speed sensors 8, 9 has failed, and to control torque output from the motor 2 based on the index value. According to this configuration, the torque of the motor 2 can be limited without using information obtained by the wheel speed sensors 8, 9, and burn-in of the differential device 3 during the failure of the wheel speed sensors 8, 9 can be prevented.

(2) In the above-described vehicle control device, the index value set in a case that at least one of the pair of wheel speed sensors 8, 9 has failed is set to have, for example, a value twice or more a rotation speed input to the differential device 3. Accordingly, the index value can be set to a value (or a value equal to or higher than the value) corresponding to the maximum rotation speed difference that may be generated in at least the differential device 3. Therefore, it is possible to reliably prevent the occurrence of burn-in in the differential device 3.

(3) As shown in FIG. 3, the predetermined coefficient is set to 2, so that the index value is set to have a value twice a value obtained by dividing the motor rotation speed by a gear ratio. According to this setting, the index value is a value corresponding to the maximum rotation speed difference that may be generated in the differential device 3, and the occurrence of burn-in in the differential device 3 can be prevented most efficiently and reliably. In consideration of the presence of a control error, a calculation error, or the like, it is also possible to recognize the technical significance of setting the value of the predetermined coefficient to be slightly shifted from 2.

(4) In the above-described vehicle control device, as shown in FIGS. 4A and 4B, a map that defines a relationship between the index value and the torque limit value is used. Torque output from the motor 2 is controlled in a manner of not exceeding the torque limit value of a magnitude corresponding to the index value using this map, so that a situation can be easily avoided in which excessive torque is input to the differential device 3. Further, the relationship between the index value and the torque limit value is mapped, so that the value of the torque limit value can be obtained quickly and easily, and a calculation load can be reduced. Therefore, for example, it is possible to prevent the occurrence of burn-in due to a control delay of the motor 2.

(5) In the above-described vehicle control device, in a case that the pair of wheel speed sensors 8, 9 do not fail, a rotation speed difference between the left and right drive wheels is calculated. Further, the torque limit value is acquired by substituting the rotation speed difference into the map instead of the index value. According to this control configuration, as shown in FIGS. 4A and 4B, it is only necessary to prepare a single map for one motor 2, and it is not necessary to add a new control map. Therefore, a control resource can be saved, and the occurrence of burn-in can be efficiently prevented.

[4. Modification]

The above-described embodiment is merely an example, and is not intended to exclude various modifications and application of techniques not explicitly described in the present embodiment. The configurations according to the present embodiment can be variously modified without departing from the gist thereof. Further, the configurations can be selected or discarded as necessary, or can be combined as appropriate.

For example, in the above-described embodiment, the motor 2 is used as a drive source of the vehicle 1. Alternatively, the above-described vehicle control device may be applied to a hybrid vehicle in which the motor 2 and an engine (an internal combustion engine such as a gasoline engine or a diesel engine) are used in combination. The above-described vehicle control device may be applied to an automobile in which only the engine is used as a drive source of the vehicle 1. Alternatively, the above-described vehicle control device may be applied to a vehicle in which a motor generator (a device having both a function of an electric motor and a function of a generator) is used as the drive source instead of the motor 2. At least an index value having a value obtained by multiplying a rotation speed of the drive source by a predetermined coefficient is set, and torque output from the drive source is controlled based on the index value, so that the same effects as those according to the above-described embodiment are attained.

This application is based on Japanese Patent Application No. 2020-095235, filed on Jun. 1, 2020, the contents of which are incorporated herein by reference.

INDUSTRIAL APPLICABILITY

According to the vehicle control device in the present disclosure, it is possible to prevent burn-in of a differential device in a case that a wheel speed sensor fails.

REFERENCE SIGNS LIST

1 vehicle
2 motor (drive source)
3 differential device
4 transmission
5 inverter
6 battery
7 motor speed sensor (speed sensor)
8 right wheel speed sensor (wheel speed sensor)
9 left wheel speed sensor (wheel speed sensor)
10 control device (electronic control device)
11 divider
12 absolute value calculator
13 multiplier
14 multiplier
15 failure determiner
16 subtractor
17 subtractor
18 absolute value calculator
19 multiplier
20 adder
21 limit value setter

The invention claimed is:

1. A vehicle control device comprising:
a drive source mounted on a vehicle;
a differential device configured to distribute a driving force generated by the drive source to a right drive wheel and a left drive wheel;
a speed sensor configured to detect a rotation speed of the drive source;
a pair of wheel speed sensors configured to detect rotation speeds of the right drive wheel and the left drive wheel; and
a control device configured to set an index value having a value obtained by multiplying a value obtained by dividing the rotation speed of the drive source by a gear ratio from the drive source to the differential device by a predetermined coefficient in a case that at least one of the pair of wheel speed sensors fails, and to control torque output from the drive source based on the index value,
wherein the predetermined coefficient is set within a range of 1.9 to 2.1.

2. The vehicle control device according to claim 1,
wherein the predetermined coefficient is set to 2 or more so that the index value is set to have a value twice or more the value obtained by dividing the rotation speed of the drive source by a gear ratio from the drive source to the differential device.

3. The vehicle control device according to claim 1,
wherein the predetermined coefficient is set to 2 so that the index value is set to have a value twice the value obtained by dividing the rotation speed of the drive source by a gear ratio from the drive source to the differential device.

4. The vehicle control device according to claim 1,
wherein the control device has a map that defines a relationship between the index value and a torque limit value, and controls the torque output from the drive source so as not to exceed the torque limit value having a magnitude corresponding to the index value.

5. The vehicle control device according to claim 4,
wherein, in a case that the pair of wheel speed sensors do not fail, the control device calculates a rotation speed difference between the right drive wheel and the left drive wheel, and acquires the torque limit value by substituting the rotation speed difference into the map.

* * * * *